(12) United States Patent
Last et al.

(10) Patent No.: US 6,507,918 B1
(45) Date of Patent: Jan. 14, 2003

(54) METHOD FOR THE IMPLEMENTATION OF A FAULT DIAGNOSTIC SYSTEM AND IN-VEHICLE FAULT DIAGNOSTIC SYSTEM

(75) Inventors: Bernd Last, Donaustauf (DE); Martin Jehle, Regensburg (DE); Stefan Treinies, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/392,853

(22) Filed: Sep. 9, 1999

(30) Foreign Application Priority Data

Sep. 9, 1998 (DE) .......................................... 198 41 267

(51) Int. Cl.[7] .............................................. G06F 11/00
(52) U.S. Cl. .............................. 714/25; 701/31; 706/49
(58) Field of Search ........................ 701/31, 35; 714/31, 714/45, 25, 48; 706/49

(56) References Cited

U.S. PATENT DOCUMENTS

| | | | | |
|---|---|---|---|---|
| 3,696,340 A | * | 10/1972 | Matsushita et al. .......... 712/227 |
| 4,817,418 A | * | 4/1989 | Asami et al. .................. 714/45 |
| 5,331,560 A | * | 7/1994 | Tamura ....................... 123/479 |
| 5,448,722 A | * | 9/1995 | Lynne et al. ................ 324/73.1 |
| 5,500,797 A | * | 3/1996 | Noger .......................... 701/14 |
| 5,631,831 A | * | 5/1997 | Bird et al. ................... 701/102 |
| 5,740,354 A | * | 4/1998 | Ben-Natan et al. ........... 714/45 |
| 5,757,645 A | * | 5/1998 | Schneider et al. ............. 701/29 |
| 5,930,824 A | * | 7/1999 | Anglin et al. ................ 345/418 |
| 5,939,625 A | * | 8/1999 | Torii et al. ............. 267/140.11 |
| 6,295,488 B1 | * | 9/2001 | Longere ....................... 701/29 |
| 6,430,590 B1 | * | 8/2002 | Fischer ....................... 709/100 |
| 6,442,458 B2 | * | 8/2002 | Kubo et al. .................... 701/29 |

FOREIGN PATENT DOCUMENTS

| | | | | |
|---|---|---|---|---|
| DE | 40 40 927 | | 12/1990 | |
| JP | 09081410 A | * | 3/1997 | .......... G06F/11/22 |

OTHER PUBLICATIONS

K. Mischker, et al., "A New Object–Oriented Diagnostic System Management for Powertrain Control Units with OBD", SAE Technical Paper Series 980512 (1998).

* cited by examiner

Primary Examiner—Scott Baderman
Assistant Examiner—Gabriel L. Chu
(74) Attorney, Agent, or Firm—Schiff Hardin & Waite

(57) ABSTRACT

In a method for implementation of a fault diagnostic system having a number of diagnostic modules and in an in-vehicle fault diagnostic system, a second diagnostic module whose diagnostic result depends on the result of the fault diagnosis of at least one first diagnostic module begins its diagnostic cycle without waiting for the diagnostic result of the first diagnostic module. The second diagnostic module writes its diagnostic result into a secondary fault memory. When the first diagnostic module has ended its diagnostic cycle without finding a fault, the diagnostic result of the second diagnostic module is transferred from the secondary fault memory into a primary fault memory.

7 Claims, 2 Drawing Sheets

METHOD FOR THE IMPLEMENTATION OF A FAULT DIAGNOSTIC SYSTEM AND IN-VEHICLE FAULT DIAGNOSTIC SYSTEM

BACKGROUND OF THE INVENTION

The present invention is directed to a method for the implementation of a fault diagnostic system having a number of diagnostic modules that monitor sub-systems, and to an in-vehicle fault diagnostic system.

Electronic control devices for controlling and regulating systems frequently comprise diagnostic modules for recognizing faults in the controlled or regulated system. The diagnostic results can, for example, result in a deactivation of sub-systems, a drive of alarm displays or an entry into a fault memory for documentation purposes. Such control devices are utilized particularly often in motor vehicles.

In a networked system, an outage of an individual component or of a sub-system can deteriorate the correct function of other components or sub-systems. When such cross-dependencies are not taken into consideration in a system of diagnostic modules, this, in addition to leading to the entry of the causative fault, leads to further entries of successor faults into a fault memory. Such successor faults can, under certain circumstances, characterize correctly operating sub-systems or components as being faulty.

In order to avoid the entry of successor faults into the fault memory, a cross-interlock of functions can ensue. It must thereby be assured that the causative fault is recognized before the successor fault. This is achieved in that diagnostic modules that are dependent on one another are started in a specific sequence, so that a diagnostic module whose diagnostic result is dependent on the result of the fault diagnosis of a different diagnostic module is not started until after the arrival of the corresponding diagnostic result.

German Patent Application No. 40 40 927 discloses fault storing in a control means of a motor vehicle, whereby a fault sequence is deposited in a fault sequence memory in the sequence of the occurrence of the faults. Whether the fault is present at the moment is identified in a fault register memory for each fault of the fault sequence memory, being identified by a fault identification flag. An entry into the fault sequence memory only ensues when the pertaining fault identification flag is not set for an occurring fault.

SAE Technical Paper Series 980512, "A New Object-Oriented Diagnostic System Management for Power-Train Control Units with ODB", presents an in-vehicle (on-board) diagnostic system that comprises a set of central modules for handling cross-connections. Due to the introduction of central modules for a fault handling, a better configuration of the system is achieved compared to local cross-interlocks of diagnostic functions. The central modules assume the job of a central administration and coordination of error statuses that are reported by the diagnostic functions.

SUMMARY OF THE INVENTION

An object of the present invention is to offer a method for the implementation of a fault diagnostic system and a fault diagnostic system having a number of diagnostic modules, whereby the sequence of the fault messages arriving from the diagnostic modules need not be taken into consideration.

This object is achieved in accordance with the invention in a method for implementing a fault diagnostic system having a number of diagnostic modules that monitor sub-systems during a diagnostic cycle and provide a diagnostic result and in an in-vehicle fault diagnostic system operating according to the method.

In an embodiment, a diagnostic cycle of a second diagnostic module is started without waiting for a diagnostic result of a first diagnostic module, the second diagnostic module having a diagnostic result dependent on a result of a fault diagnosis of at least one first diagnostic module. The diagnostic result of the second diagnostic module is written into a secondary fault memory when the diagnostic result of the first diagnostic module is not yet provided after an end of the diagnostic cycle of the second diagnostic module. The diagnostic result of the second diagnostic module is written into a primary fault memory when the first diagnostic module has not diagnosed a fault after an end of a diagnostic cycle of the first diagnostic module, the primary fault memory having entries for judging functionability of the sub-systems.

The distinction between a primary and a secondary fault memory makes it possible to classify a diagnostic result as preliminary. When all boundary conditions are met, particularly when all diagnostic results are present from which the diagnostic result of the pertaining diagnostic module depends, the diagnostic result classified as preliminary can be classified as final. A diagnostic module dependent on the result of another diagnostic module need therefore not necessarily wait for the arrival of the pending diagnostic result but can already start its diagnostic cycle. This is of particular advantage when the diagnostic modules must process comparatively time-consuming routines or when a diagnostic module is dependent on the diagnostic result of a chain of diagnostic modules.

When it is found that the preliminary diagnostic result is based on values that were considered faulty by another diagnostic module, then the dependent diagnostic result is preferably deleted from the secondary fault memory.

In one embodiment of the invention, the diagnostic result of a second diagnostic module that is dependent on the diagnostic result of a first diagnostic module is also written into the fault memory when the first diagnostic module has terminated its diagnostic cycle before the second diagnostic module and has not recognized any fault. The decision as to whether a diagnostic result is transferred from the secondary fault memory into the primary fault memory can then be made by a central diagnostic module. As a result thereof, the configuration of the fault diagnostic system is simplified.

In an embodiment, dependencies between diagnostic modules are stored in a table or matrix (cross-interlock matrix). A diagnostic module or a central diagnostic module can derive from this matrix whether a diagnostic result is to be interpreted as preliminary or final. Accordingly, the diagnostic result is then entered into the primary fault memory or into the secondary fault memory.

Although the invention can be utilized both in vehicles and production systems as well as in combination with any system to be monitored, the preferred area of employment is the fault diagnosis of sub-systems of a motor vehicle. For example, this can thereby be a matter of a fault diagnosis in conjunction with a motor control device, a power train control, an electromechanical braking system, an electromagnetic valve control or the like.

These and other features of the invention(s) will become clearer with reference to the following detailed description of the presently preferred embodiments and accompanied drawings.

DETAILED DESCRIPTION OF THE PRESENTLY PREFERRED EMBODIMENTS

Figure 1:
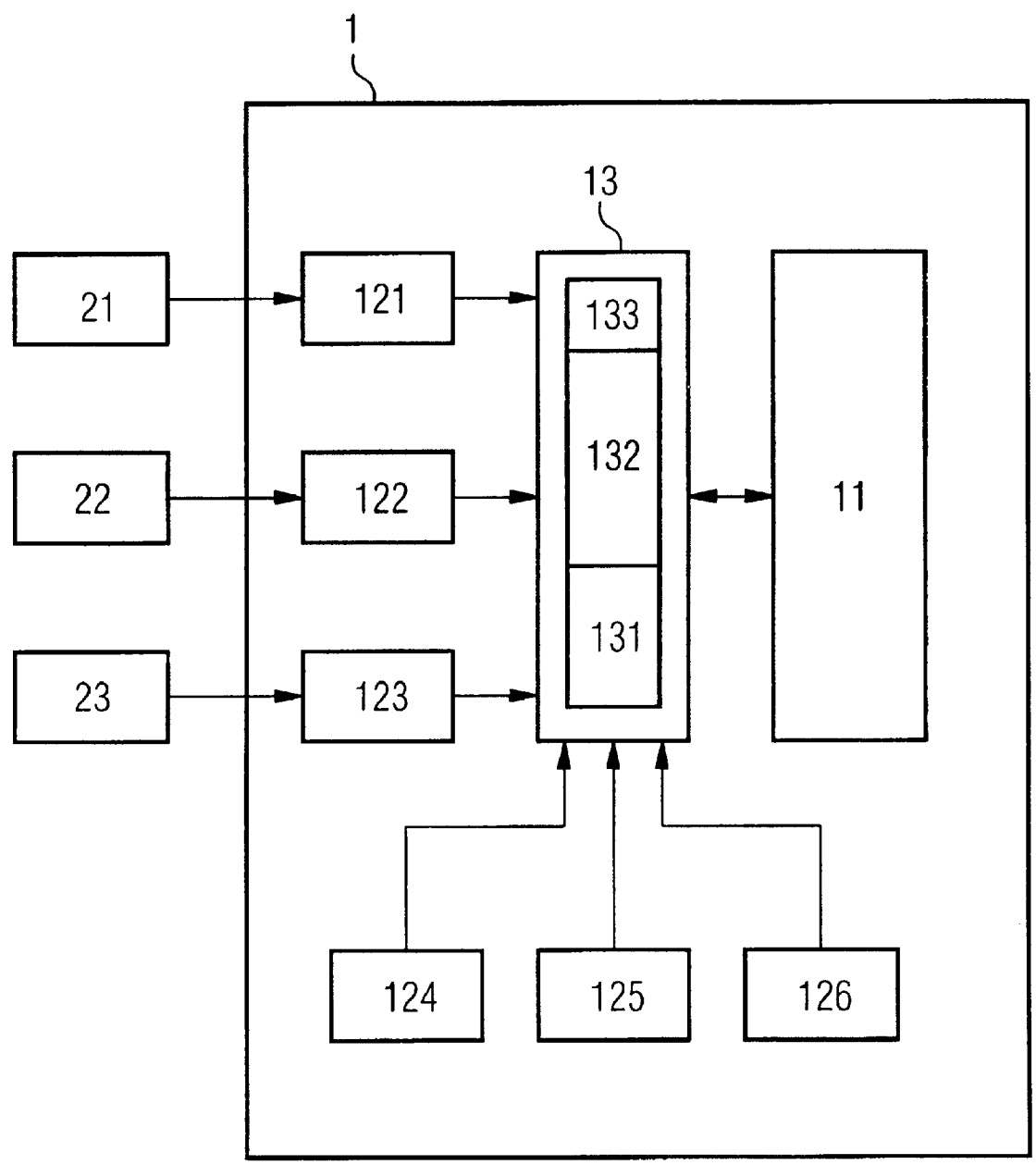
FIG. 1 is a schematic block diagram of an electronic control device having a fault diagnostic system.

An electronic control device 1 illustrated in FIG. 1 controls and regulates a motor (not shown) of a motor vehicle. The control device 1 comprises at least one microprocessor (not shown) that controls not only the motor (not shown) but also the implementation of fault diagnostics.

A central diagnostic module 11 and a number of local diagnostic modules 121 through 124 are implemented in the control device 1. Further, an erasable and re-writable memory 13 is located in the control device 1, the central diagnostic module 11 having both read access as well as write access thereto and the local diagnostic modules 121 through 123 having only write axis thereto.

The memory 13 comprises areas for a normal, primary fault memory 131, a temporary, secondary fault memory 132 as well as an area 133 for a marking or a flag.

The local diagnostic modules 121 through 123 are respectively connected to a sub-system 21 through 23 and are functionally not necessarily topically allocated thereto. Sub-system 21 is a lambda probe, sub-system 22 is an air mass sensor and sub-system 23 is a coolant temperature sensor. The local diagnostic module 124 implements a catalyst efficiency diagnosis.

An adaption module 125 offers a correction factor for a control of a fuel/air mixture that takes permanent or longer-duration deviations of the mix processing system from the rate condition into consideration.

A regulation module 126 regulates the fuel/air mixture to a predetermined rated value taking the correction factor offered by the adaption module 125 into consideration.

An evaluation module (not shown) that s connected to the sub-system 21 (lambda probe) communicates the measured sensor signals both to the local diagnostic module 124 that implements the catalyst efficiency diagnosis as well as to the adaption module 125 and to the regulation module 126. The local diagnostic module 124 can then accurately identify the efficiency of a catalyst when the local diagnostic module 121 has found no fault in the sub-system 21 (lambda probe). The diagnostic result of the diagnostic module 124 is therefore dependent on the diagnostic result of the diagnostic module 121 (lambda probe diagnostic module). Both diagnoses require a relatively long time interval for a pass or diagnostic cycle.

Figure 2:
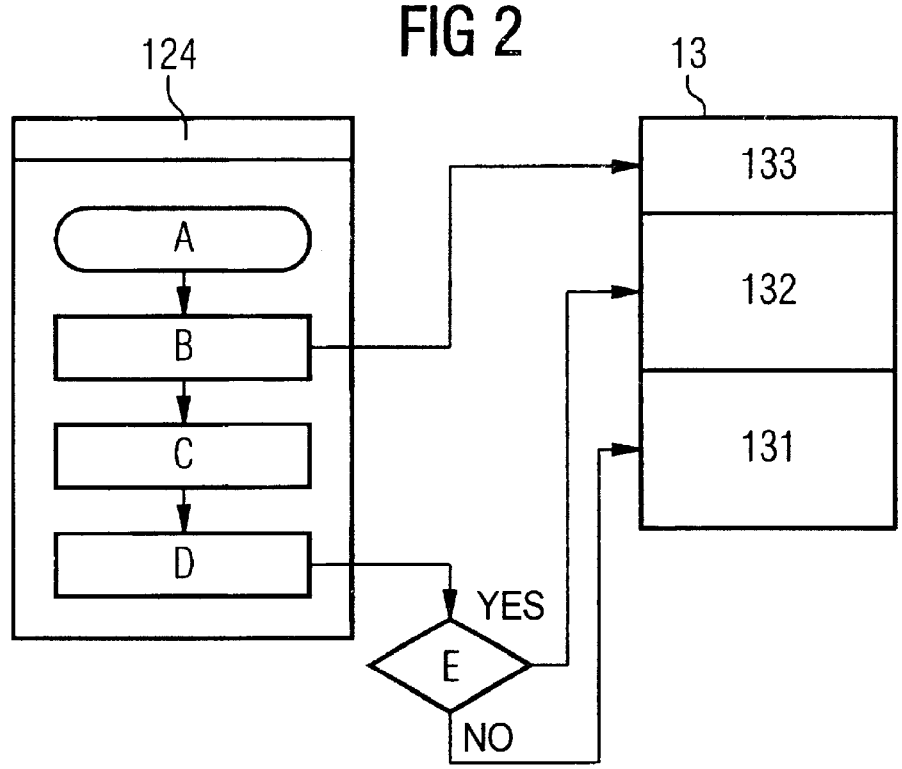
FIG. 2 is a flow chart for a diagnostic module.

FIG. 2 shows the executive sequence of the diagnosis of the diagnosis module 124 (catalyst efficiency diagnosis).

The diagnosis procedure for checking the catalyst efficiency begins with Step A.

In Step B, the diagnostic module 124 checks whether diagnostic results from other diagnostic modules are still needed for a potential fault entry. The diagnostic module 124 obtains the information for this purpose via the respective fault conditions of those diagnostic modules on whom the result of the diagnostic module 124 depends. The fault conditions thereby contain both the results of the diagnoses as well as the information as to whether the respective diagnosis has already been ended. The dependencies of the diagnostic modules on one another are described in a table or cross-interlock matrix. During the check, the diagnostic module 124 finds that a deriving diagnostic result has the reservation that the diagnostic module 121 found no error of the sub-system 21 after the end of its diagnosis. The diagnostic module 124 therefore sets a marking or a reservation flag in the memory area 133 of the memory 13.

In Step C, subsequently, the actual diagnosis of the catalyst efficiency is undertaken without waiting for the pending diagnostic result of the diagnostic module 121.

The report of the diagnostic result to the fault memory ensues in Step D. Before output of the result, a check is carried out in Step C to see whether a reservation flag was set as marking of a dependency. When the reservation flag was not set, the diagnostic result is entered into the normal, primary fault memory 131. Since the reservation flag was set in this example, the diagnostic result is written into the temporary, secondary fault memory 132.

Only the primary fault memory 131 is accessible given a readout of the fault memory. A fault possibly recognized in the described diagnostic cycle that, however, is potentially based on a faulty operation of the sub-system 21 (lambda probe) and not on the catalyst is not displayed upon readout of the fault memory 13 of the control device 1. On the contrary, the preceding status of the diagnostic module 124 is still stored in the primary fault memory 131 and can be read out.

Figure 3:
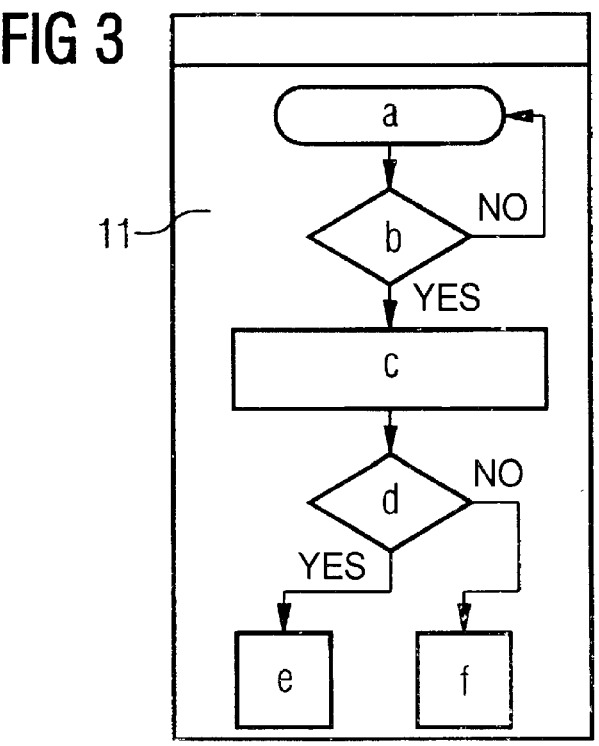
FIG. 3 is a flow chart for a background process.

FIG. 3 illustrates a transfer of a diagnostic result from the secondary fault memory 132 into the primary fault memory 131. This transfer is controlled by the central diagnostic module 11.

In Step a, a process begins that the microprocessor of the control device 1 processes in parallel to other processes, for example ongoing fault diagnostics.

In Step b, a check is carried out for the existing diagnostic modules 121 through 124 to see whether a reservation flag for marking a dependency relationship has been set. When no reservation flag is set, then this background process is restarted after expiration of a defined time.

When, by contrast, a reservation flag has been set by at least one diagnostic module, then a check is carried out in Step c to see whether all conditions are met and to see whether the validity of the diagnostic result marked as preliminary can be decided. This is the case for the example illustrated in FIG. 2 when the diagnostic result of the diagnostic module 121 (lambda probe diagnostic module) is present. This check is undertaken on the basis of a table or matrix in whose rows the result-supplying diagnostic modules are entered and in whose columns the diagnostic modules are entered that are dependent on the diagnostic modules supplying results. In this example, a dependency in the row of the diagnostic module 121 is identified in the column for the diagnostic module 124.

A check is made in Step d to see whether the result supplied by the dependent diagnostic module, i.e. the results applied by the diagnostic module 124, is valid or invalid. The diagnostic result of the dependent diagnostic module 124 is valid when the result-supplying diagnostic module 121 has not found any fault of the sub-system 21.

When it is found that the diagnostic result of the dependent diagnostic module 124 is valid, then a branch is made in Step e. This means that the diagnostic results stored in the temporary, secondary fault memory 132 is copied into the normal, primary fault memory 131.

When, by contrast, the result-supplying diagnostic module 121 indicates a fault of the sub-system 21, then a branch is made to Step f. In this case, the status of the secondary fault memory 132 is not transferred into the primary fault memory 131 since it has no force of testimony. On the contrary, the result of the diagnostic module 124 in the secondary fault memory 132 is deleted.

One proceeds in the same way with the results of further diagnostic modules when these diagnostic modules have set a marking or flag in the memory area 133.

Although modifications and changes may be suggested by those of ordinary skill in the art, it is the intention of the inventors to embody within the patent warranted hereon all changes and modifications as reasonably and properly come within the scope of their contribution to the art.

We claim as our invention:

1. A method for implementing a fault diagnostic system having a number of diagnostic modules that monitor sub-systems during a diagnostic cycle and provide a diagnostic result, said method comprising the steps of:

starting a diagnostic cycle of a second diagnostic module without waiting for a diagnostic result of a first diagnostic module, said second diagnostic module having a diagnostic result dependent on a result of a fault diagnosis of at least one first diagnostic module;

writing said diagnostic result of said second diagnostic module into a secondary fault memory when said diagnostic result of said first diagnostic module is not yet provided after an end of said diagnostic cycle of said second diagnostic module; and writing said diagnostic result of said second diagnostic module into a primary fault memory when said first diagnostic module has not diagnosed a fault after an end of a diagnostic cycle of said first diagnostic module, said primary fault memory having entries for judging functionability of said sub-systems.

2. The method according to claim 1, further comprising the step of:

writing said diagnostic result of said second diagnostic module into said secondary fault memory when said diagnostic cycle of said first diagnostic module ends prior to an ending of said diagnostic cycle of said second diagnostic module.

3. The method according to claim 1, further comprising the step of:

controlling said writing of said diagnostic result of said second diagnostic module into said secondary fault memory by a central diagnostic module.

4. The method according to claim 1, wherein said writing of said diagnostic result of said second diagnostic module into said primary fault memory and into said secondary fault memory being under conditions prescribed in a matrix.

5. The method according to claim 1, further comprising the step of:

providing a diagnostic module with a marking when said diagnostic module diagnoses a fault and said fault diagnostic result being written into said secondary fault memory and not into said primary fault memory.

6. The method according to claim 1, wherein a mark being provided to control a transfer of a content of said primary fault memory into said secondary fault memory.

7. The method according to claim 1, wherein said secondary fault memory being provided with a second identifier and said primary memory being provided with a first identifier different than said second identifier; and further comprising the step of: transferring a diagnostic result from said secondary fault memory into said primary fault memory based on an exchange of said first and second identifiers.

* * * * *